(12) United States Patent
Pringiers

(10) Patent No.: US 6,474,755 B1
(45) Date of Patent: Nov. 5, 2002

(54) RUBBER CRAWLER

(75) Inventor: Koenraad Pringiers, Colombo (LK)

(73) Assignee: Tweco, Ghent (BE)

( * ) Notice: Subject to any disclaimer, the term of this patent is extended or adjusted under 35 U.S.C. 154(b) by 0 days.

(21) Appl. No.: 09/471,800

(22) Filed: Dec. 23, 1999

(30) Foreign Application Priority Data

Dec. 24, 1998 (BE) ............................................ 09800933

(51) Int. Cl.[7] ............................................ B62D 55/253
(52) U.S. Cl. ........................ 305/171; 305/170; 305/177
(58) Field of Search ................................. 305/165, 169, 305/171, 173, 174, 175, 176, 177, 193, 195, 197, 167, 170, 172

(56) References Cited

U.S. PATENT DOCUMENTS

| | | | | |
|---|---|---|---|---|
| 1,947,474 A | * | 2/1934 | Knox | 305/171 |
| 2,290,109 A | * | 7/1942 | Wayne | 305/171 X |
| 3,359,044 A | * | 12/1967 | Boggs | 305/193 |

FOREIGN PATENT DOCUMENTS

| | | | | |
|---|---|---|---|---|
| EP | 78635 | * | 5/1983 | 305/173 |
| EP | 0428725 | | 5/1991 | |
| EP | 0497597 | | 8/1992 | |
| JP | 55-55064 | * | 4/1980 | 305/173 |
| JP | 55-55066 | * | 4/1980 | 305/173 |
| JP | 55-68479 | * | 5/1980 | 305/177 |
| JP | 55-87670 | * | 7/1980 | 305/171 |
| JP | 57-95274 | * | 6/1982 | 305/171 |
| JP | 59-106378 | * | 6/1984 | 305/177 |
| JP | 3-239682 | * | 10/1991 | 305/174 |
| JP | 4-129888 | * | 4/1992 | 305/174 |
| JP | 4-159185 | * | 6/1992 | 305/174 |
| WO | 94/25327 | | 11/1994 | |

* cited by examiner

Primary Examiner—Russell D. Stormer
(74) Attorney, Agent, or Firm—Pillsbury Winthrop LLP

(57) ABSTRACT

A rubber crawler includes an endless rubber belt directed around two toothed wheels, whereby in the circumferentrial direction of the rubber belt parallel metal core elements are embedded in the rubber belt and extend in cross direction of the rubber belt and are provided for guiding supporting rolls provided between the toothed wheels, each metal core element includes a guiding for guiding the supporting rolls and a carrier for receiving the guiding, and the carrier and the guiding are made as separate parts and are connected to each other.

13 Claims, 7 Drawing Sheets

RUBBER CRAWLER

Figure 1A:
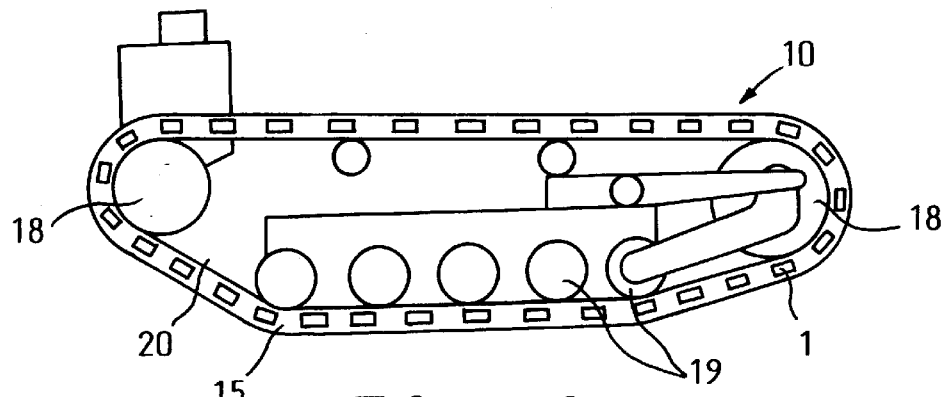

This invention relates to a rubber crawler comprising an endless rubber belt directed around two toothed wheels, whereby in circumferential direction of the belt parallel metal core elements are embedded in the rubber belt and extend in cross direction of the rubber belt and are provided for guiding supporting rolls provided between said wheels.

From EP-A-30.488 a rubber crawler is known which is driven around a toothed sprocket wheel and intermediate wheel. In the interior of the rubber crawler, distributed over the internal circumference of the belt, between the sprocket wheel and intermediate wheel, supporting rolls are provided for supporting the rubber belt. In longitudinal direction of the belt, at a regular distance from each other, metal core elements are partly embedded in the rubber, at a regular distance from each other. Each metal core element contains a basis with two wings that extend in transversal direction of the belt. The basis is provided with a guiding which forms the running surface for the supporting rolls. Between the guidings of successive core elements, a rubber layer of rubber of the belt is present. In the middle of the rubber crawler, between successive metal core elements, sprocket holes are provided for receiving teeth of the sprocket wheel for driving the rubber belt.

During the displacement of the rubber crawler over the bottom, the supporting rolls roll over the guidings of successive metal core elements and the intermediate rubber. Because the running surface of the supporting rolls is discontinuous, the displacement of the supporting rolls mostly involves an undesired raising and downward movement of the supporting rolls. This raising and downward movement of the supporting rolls involves undesired vibrations in the rubber crawler and an undesired noise pollution.

The rubber crawler disclosed in EP-A-300.488 contains in the middle part two projections extending in the direction of the interior of the rubber belt. To decrease the above described vibrations and damaging of the belt—due to the deposition of water, sand etc. between the contact surface of the rubber with the metal core elements through defects in the surface of the rubber belt—the basis of the metal core elements facing the interior of the rubber belt is provided with an extension. This extension is situated between each projection and an end of the metal core element, extends in longitudinal direction of the belt and constitutes the running surface of the supporting rolls.

The rubber crawler known from EP-A-300.488 however presents the disadvantage that the vibrations caused by the rolling of the supporting rolls over the metal core elements, are still too large. Upon displacement of the machine over transverse obstructions and the rotation of the rubber belt around its transversal axis when taking a bend, the metal core elements are moreover subjected to relatively large forces. This involves a regular breaking of the metal core elements out of the rubber belt. This is undesired.

It is the aim of the present invention to provide a rubber crawler wherein the above described vibrations following the displacement of the supporting rolls over the metal core elements can be further decreased.

This is achieved with this invention in that each metal core element comprises a guiding for guiding the supporting rolls and a carrier for receiving the guiding. The carrier and guiding are executed as separate parts and are connected with each other.

Due to the separation of the metal core element in at least two separate parts, that are dissociated from each other, namely a first part containing the guiding for the supporting rolls and a second part containing a carrier for this guiding, the forces exerted by the supporting rolls to the guiding are decomposed into components. This decomposition of the forces provides the possibility of reducing the net forces that are transferred from the guiding, through the connection to the carrier. As a consequence, also the forces that act upon the contact surface of the carrier with the rubber belt, can be reduced so that the metal core elements will less easily break out of the rubber. The splitting of the metal core element in a guiding and a carrier for this guiding thus allows to reduce the forces that act upon the contact surface of the metal core element with the surrounding rubber belt, and that are responsible for the destruction of the bond of the metal core element in the rubber belt and the breaking out of the metal core elements from the rubber belt.

A man skilled in the art would never consider to produce a metal core element for a rubber crawler out of several parts. A man skilled in the art will usually assume that a rigid support for a rubber belt, which must be capable of absorbing rather high traction and torsion forces, and of distributing these forces more or less uniform over the rubber belt, should be a massive entity. The man skilled in the art will rather assume that by the splitting of the metal core element in two or more parts, the strength of the metal core element is broken and as a consequence, the strength of the rubber crawler will be adversely influenced. In addition to this, by the splitting of the metal core element in a guiding and a carrier for the guiding, a part with a smaller mass must ensure the absorption and distribution of the forces over the rubber. The man skilled in the art will thereby assume that by the smaller mass of the carrying part, the forces to which the metal core elements are subjected, will be capable of overcoming the bonding of the core element in the rubber and that thus the breaking of the metal core elements out of the rubber belt is facilitated. It appears that this is not the case.

The guiding of the metal core element of this invention can be made as one entity or in two separate parts.

Between the guiding and the carrier, preferably a damping layer is provided, for at least partly absorbing and reducing the vibrations that are amongst others caused by the displacement of the supporting rolls over the guiding. Because these vibrations can at least partly be neutralised by the damping layer, the forces that must be transferred from the guiding to the carrier, can be correspondingly decreased. In that way the possibility of the core elements to break out of the rubber belt can be further decreased. The damping layer ensures simultaneously that the noise pollution caused by the displacement of the supporting rolls over the metal core elements can be decreased and prevents that vibrations originating from the outside can be transferred simply towards the inside of the rubber crawler.

In order to facilitate the displacement over transversal obstacles and to allow thereby that the rubber crawler thereby adapts itself to the obstacle, and in order to prevent that vibrations of the supporting rolls during their displacement over successive guidings are adversely increased, the guiding is preferable tiltably mounted in the carrier. This allows the guiding to position itself independently of the carrier, that the continuity of the running surface of the supporting rolls to be adversely affected to a lesser extent. The tiltable mounting namely allows that the guiding of a metal core element upon overcoming an obstacle can tilt somewhat in the direction of the guiding of a subsequent core element, so that the level difference that must be overcome by the supporting rolls during their displacement over successive guidings can be reduced and the associated vibrations can be correspondingly reduced.

The metal core element of the rubber crawler of this invention preferably comprises means for mechanically anchoring the metal core elements in the rubber belt.

An analysis of the driving of the rubber crawler namely has shown that during the driving, the sprocket wheel and intermediate wheel engage the sprocket holes and that thereby relatively high traction forces are exerted to the edges of the sprocket holes. These traction forces are transferred to the metal core elements and therefrom to a steel cord applied in longitudinal direction of the rubber crawler. In the known rubber crawler, the surface of the metal core element is subjected to a chemical treatment to establish a bonding of the metal to the rubber, and to allow a good transmission of traction forces from the metal core element is to the rubber. The thus obtained bonding is however insufficient. It has namely been shown that the metal is loosened from the rubber and the metal core elements can break out of the rubber belt when a massive obstacle, for example a piece of stone or a rock becomes clamped between the supporting rolls and the rubber belt. By providing a mechanical anchoring of the metal core elements, besides a chemical bonding, an improved anchoring of the metal core elements can be obtained, and it becomes possible to avoid that the metal core elements break out of the rubber crawler.

In a preferred embodiment of this invention, the carrier comprises in transversal direction of the rubber belt, a first and a second hole extending in height direction of the carrier, and the guiding comprises a first and a second protrusion. The first and second protrusion are provided to extend throughout respectively the first and second hole, so as to provide a simultaneous anchoring of the guiding and the carrier.

The first and second protrusion preferably comprise a hole that extends in longitudinal direction of the belt, for receiving a steel cord extending in longitudinal direction of the belt. The steel cord is provided for extending through holes in successive guidings. In the known rubber crawler mostly one or more parallel extending steel cords are provided in circumferential direction of the rubber crawler as reinforcing material for absorbing traction forces arising during the displacement of the rubber crawler. In this preferred embodiment, the steel cord fulfils a double function and functions also as a means for anchoring the metal core element in the rubber crawler.

In order to avoid that the steel cord be subjected to too much wearing, following friction between the steel cord and the mechanical anchoring, means for protecting the steel cord can be provided. This can for example be realised by providing the interior of the holes described above, with a protective rubber layer, by embedding the steel cord in protective rubber, by providing a double row of steel cord, so that the steel cord extends throughout almost the whole hole, or to provide in the hole a metal plate that extends in longitudinal direction of the belt. Also other means known to the man skilled in the art for decreasing the friction arising between the steel cord and the mechanic anchoring means, can be used.

The carrier and guiding are further preferably provided with co-operating, complementary surfaces, so as to allow an improved position of the guiding and carrier with respect to each other.

The carrier and guiding can be made of the same or different materials. By the separation of the carrier which mainly has a carrying function, from the guiding which mainly has a transport function, each of these parts can be made in the material that is optimally adapted to its function. The carrier is preferably made of a material with a high toughness and is capable of absorbing the forces exerted tot he guiding and distributing them in an optimum way and transferring them to the rubber belt. The guiding is preferably made of a material with a good wearing resistance, so as to retard wearing of the guiding surfaces.

The present invention also relates to a metal core element as part of the above described rubber crawler.

The invention is further elucidated in the added figures and description of the figures.

Figure 1B:
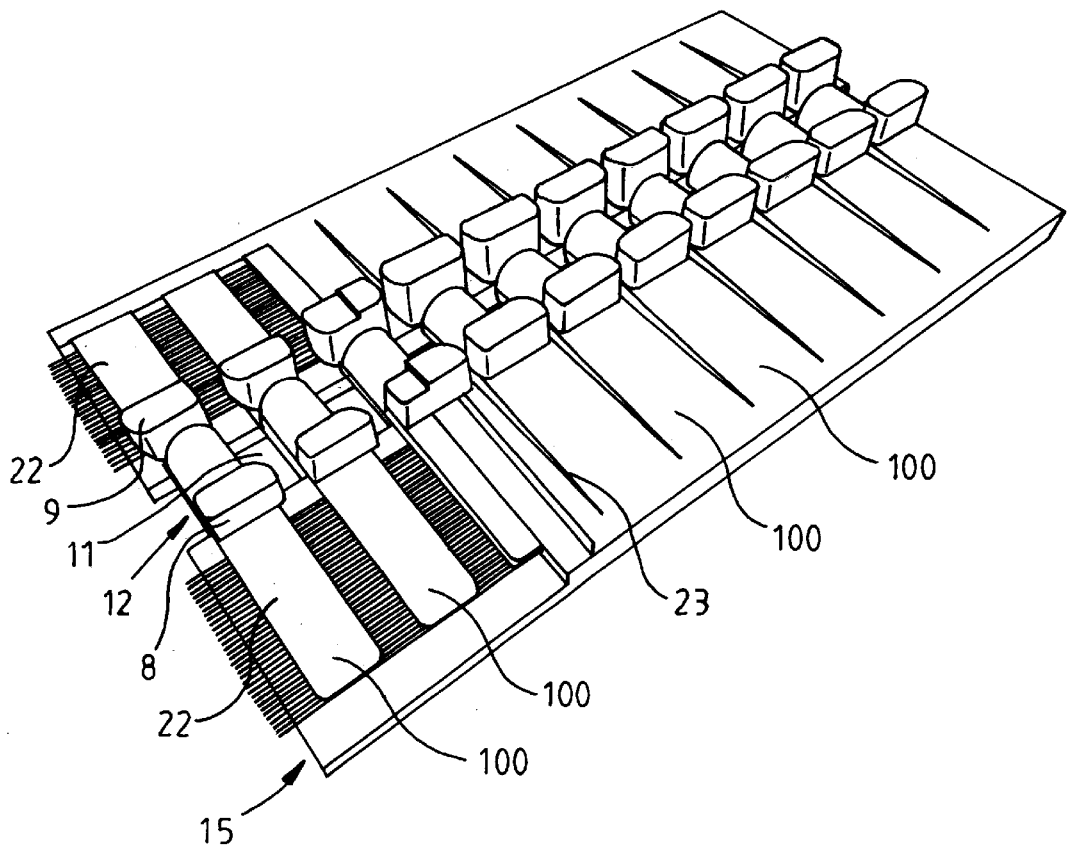

In FIG. 1$a$ a view to a rubber crawler mounted on a machine is shown. FIG. 1$b$ shows a view to a rubber crawler.

Figure 2A:
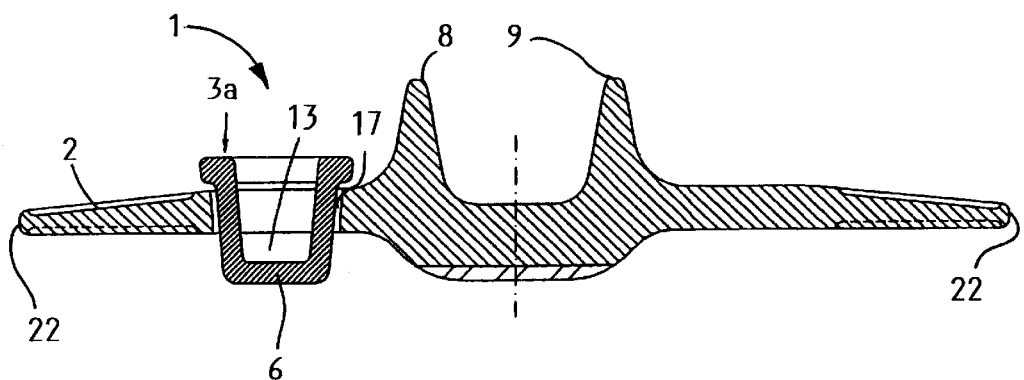
Figure 2B:
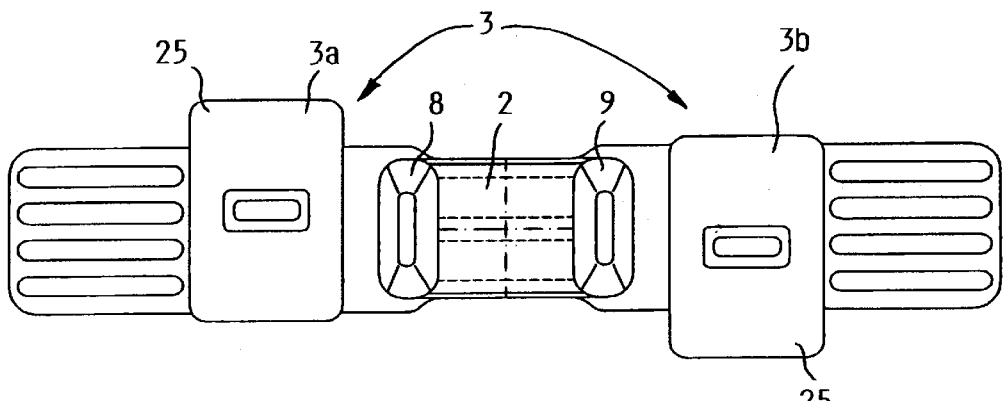

In FIGS. 2$a$–6$a$ a cross section of several possible embodiments of the metal core element of this invention is shown. In FIGS. 2$b$–6$b$ a view to the top of several embodiments of the metal core elements of this invention is shown. In FIGS. 2$c$–4$c$, a cross section of a rubber belt with embedded metal core elements shown in FIGS. 2$a$–4$a$ a is shown.

FIGS. 7–10 show a cross section of the rubber crawler with the running surface of the supporting rolls.

The rubber crawler 10 shown in FIG. 1$a$ comprises an endless rubber belt 15, mounted around toothed driving wheels 18. At the inner side 20 of the belt 15, between the driving wheels 18, supporting rolls 19 are provided for supporting the rubber belt 18. In circumferential direction of the belt 15 a plurality of metal core elements 1 are embedded, essentially parallel with each other, and at essentially the same distance from each other. The metal core elements 1 are subjected to a chemical pre-treatment so as to bring about a chemical bond of the metal to the rubber of the rubber belt 15.

As is shown in FIG. 1$b$, each metal core element 1 contains a basis 12 with two wings 22 which extend in cross direction of the belt 15. In the middle of the rubber belt 15, between two successive core elements 1 a sprocket hole is provided wherein toothed driving wheels engage during the driving of the rubber belt 10. The metal core element 1 comprises protrusions 8, 9 which extend towards the interior of the rubber crawler 10.

During the driving of the rubber crawler 10, supporting rolls are moved over the inner surface 20 of the belt 10. Thereby the supporting rolls 19 roll alternately over the guidings 8, 9, 21 and the rubber 23 between the guidings (FIGS. 2$a$–6$a$).

The metal core element 1–1"" shown in FIGS. 2$a$–6$a$ comprises a carrier and a guiding for guiding the supporting rolls. The carrier 2–2"" and guiding 3–3'" are made as separate parts and are connected to each other.

The carrier 2–2"" and guiding 3–3"" can be connected to each other through means generally known to the man skilled in the art, but are preferably connected through a damping layer 4–4"", for absorbing the vibrations caused by the displacement of the supporting rolls 19 over the rubber crawler 10. Because of the presence of the damping layer 4 also vibrations caused by the displacement of the rubber crawler 10 over obstructions can be absorbed, and it is possible to prevent that vibrations can be simply transferred from the outside of the crawler towards the inside. The material of which the damping layer 4–4"" is made can be made of a larger number of materials generally known to the man skilled in the art. The damping layer 4–4"" can for example be made of an elastic plastic material, for example a flexible rubber. The damping layer can for example be made of the rubber of which the rubber belt 15 is made, or can be made of a different material.

In the embodiment of the metal core element of this invention shown in FIGS. 2$a$–2$c$, the guiding is made in two parts 3. In the carrier 2, a first and second hole 16, 17 are provided which extend throughout the entire thickness is of the carrier 2 for receiving a guiding 3. The guiding 3 is connected to the carrier 2 through a damping layer 4.

Since the guiding 3 is subject to wearing because of the frequent contact with the supporting rolls 19, it is preferably made of a wear resistant material, preferably a metal with a high wear resistance.

On the carrier 2, a first and second protuberance 8, 9 are provided. During the driving of the rubber crawler 10, the toothed sprocket wheel 18 and intermediate wheel 18 engage the sprocket holes 11 between the metal core elements 1. Thereby a relatively high traction force is exerted to the edges of the sprocket holes 11 and the first and second protuberances 8, 9. Therefor, the material of which the carrier and first and second protuberances 8, 9 are made should be chosen such that it shows a sufficient strength and toughness, so that they are capable of absorbing these traction forces.

The guiding 3 is preferably provided with means 6, 7, 13, 14 for mechanically anchoring the guiding 3 in the rubber belt 15, thereto, the guiding 3 contains a first and second protrusion 6, 7. The first and second protrusion 6, 7 preferably extend throughout the entire thickness of the carrier 2. The anchoring of the guiding in the rubber belt 15 can be effected according to methods generally known to a man skilled in the art. The means for anchoring the guiding 3 preferably comprise a first and second hole 13, 14 provided in the first and second protrusion 6, 7. In circumferential direction of the rubber belt 15, mostly steel cords are provided so as to provide tensile strength to the rubber belt 10. The steel cords 5 are guided through the holes 13, 14 of successive metal core elements 1. Since the protrusions 6, 7 of the guiding 3 extend through the holes 16, 17 of the carrier 2, a simultaneous anchoring of the carrier and the guiding 3 in the rubber belt 10 can be ensured. Practice has shown that chemical bonding between the metal core elements 1 and the rubber belt 15 is insufficient to prevent the core elements 1 from breaking out of the rubber crawler 10. The metal core elements 1 are often subjected to a displacement towards the interior of the rubber crawler, for example in riding over obstructions, so that the chemical bonding is often subjected to heavy stresses and is after a while broken. After this breaking, the metal core elements are no longer retained in place by the rubber, resulting in a risk that they break out of the rubber belt. The mechanical anchoring means 6, 7, 13, 14 can reduce this risk, as they retain the metal core elements 1—the guidings 3 as well as the carrier 2—in place even after breaking of the chemical bonding.

The guiding 3 can contain an extension 25. The guidings 3 within a metal core element 1 are preferably staggered, so as to improve the continuity of the running surface of the supporting rolls 19.

The carrier 2 and guiding 3 can be made of the same material or different materials. Because the carrier 2 and guiding 3 are dissociated from each other, each of these parts can be made in the material that is best adapted to its function.

Figure 7:
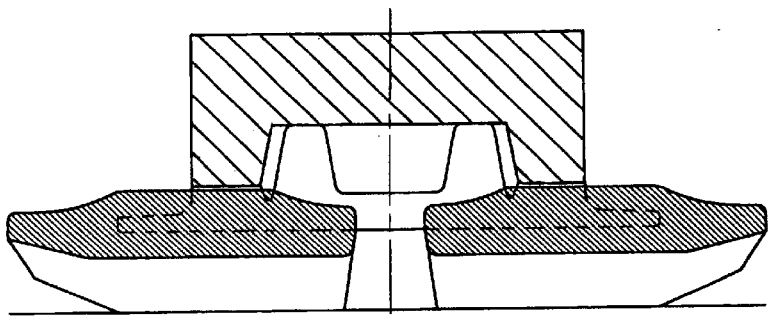
Figure 8:
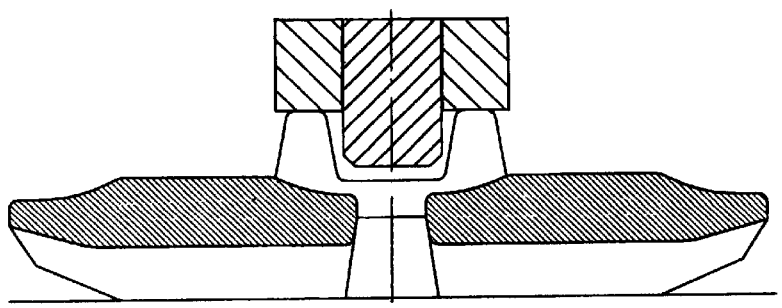
Figure 9:
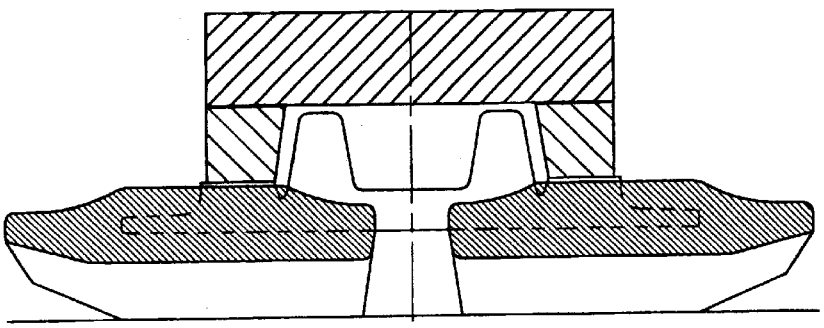
Figure 13:
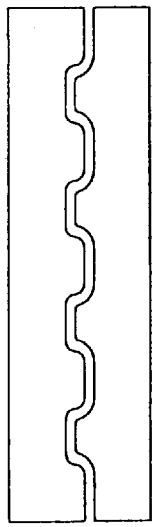
Figure 12:
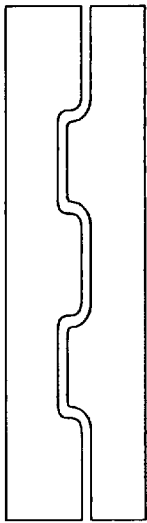
Figure 10:
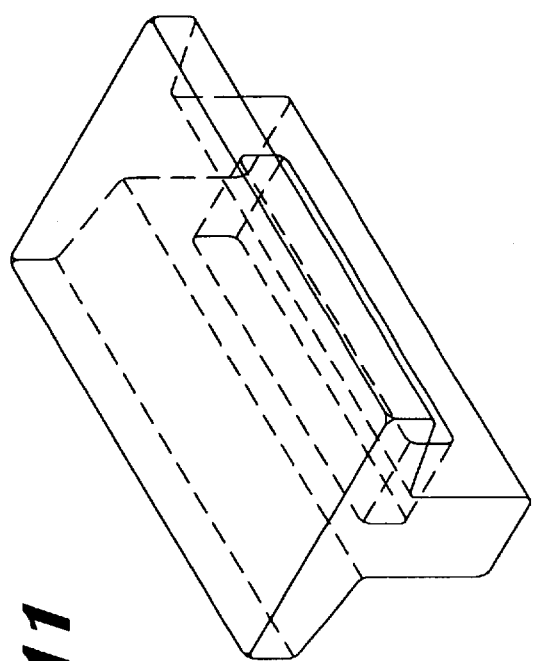

The protuberances 8 and 9 can have various shapes. They can have a shape as is shown in FIG. 2. In that case, the running surface for the supporting rolls 19 will be mainly formed by the guidings 3 as is shown in FIGS. 7 and 10. They can also be flattened at the top as is shown in FIG. 3. In that case the running surface for the supporting rolls 19 is mostly formed by the protuberances 8, 9 as is shown in FIG. 9, or by the protrusions 8 and 9 and a third protuberance 21 provided on top of the guiding 3, as is shown in FIG. 8.

The protuberances 8, 9 can contain an extension 25. The protuberances 8, 9 are preferably mounted in a staggered position with respect to each other, so as to improve the continuity of the running surface of the supporting rolls 19 and to decrease the vibrations caused by the rolling of the supporting rolls 19 over successive guidings (see FIGS. 3b–6b).

The guiding 3 is preferably tiltably mounted within the carrier 2, so as to facilitate the taking of obstructions. The tiltable mounting allows that, when taking an obstruction, the guiding 3 of a first core element is tilted towards a following core element, so that the height difference that must be overcome by the supporting rolls 19 during their displacement over successive core elements 1, can be decreased and the vibrations caused by the overcoming of height differences, can be reduced.

Figure 2C:
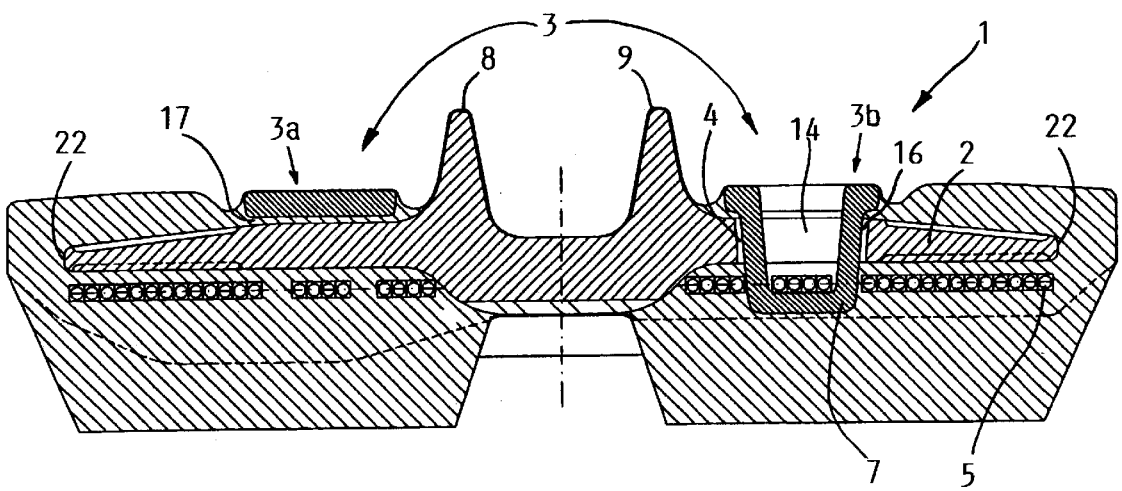

In the rubber crawler shown in FIG. 2c, the metal core element 1 is partly embedded in the rubber 23, the carrier 2 is partly embedded in the rubber 23 and the third and fourth protrusion 8, 9 are not embedded. The guiding 3 is partly embedded in the rubber 23.

The man skilled in the art will, dependant of the application choose to embed the metal core element 1, the guiding 3 and carrier 2 either completely or partly in the rubber 23.

Figure 3A:
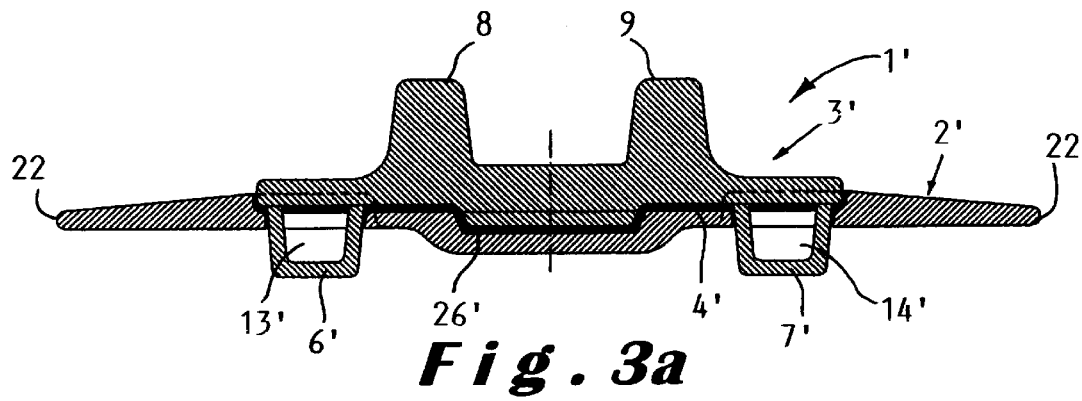
Figure 3B:
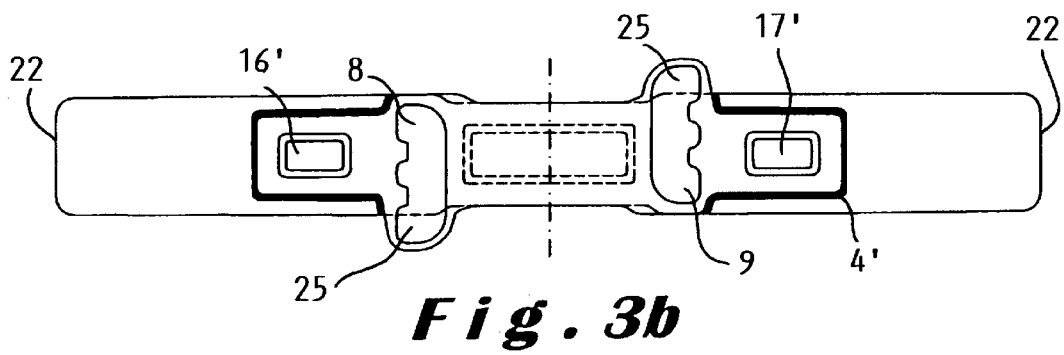
Figure 3C:
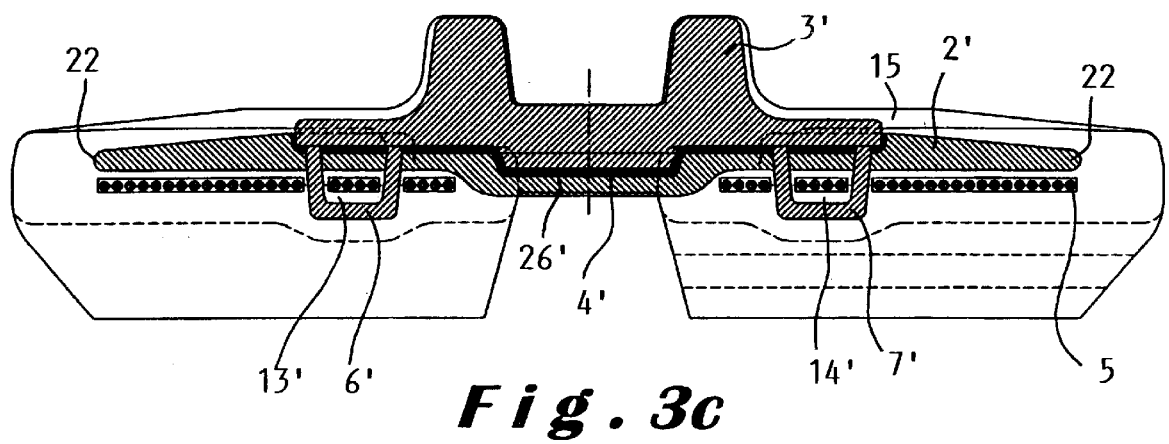

In the metal core element shown in FIG. 3a, the carrier 2' and guiding 3' are made as one part. The running surface of the supporting rolls 19 will preferably be formed by the upper surface of successive protuberances 8, 9 (FIG. 9), or by the guiding 3' and the upper surface of the protuberances 8, 9.

Figure 11:
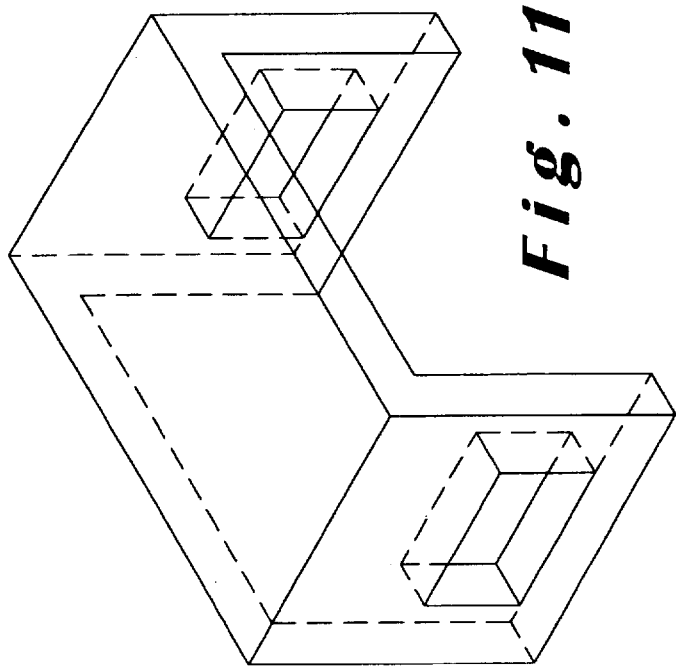

As is shown in FIGS. 3a, 3c, 4a and 4c, the carrier 2'–2" and guiding 3'–3" can be provided with complementary, co-operating profiled surfaces 26'–26", so as to allow a better positioning of the carrier 2'–2" and guiding 3'–3" with respect to each other. The shape of these profiled surfaces can be varied widely, as is generally known to the man skilled in the art. Possible embodiments for those profiled surfaces are shown in FIG. 11.

Figure 4A:
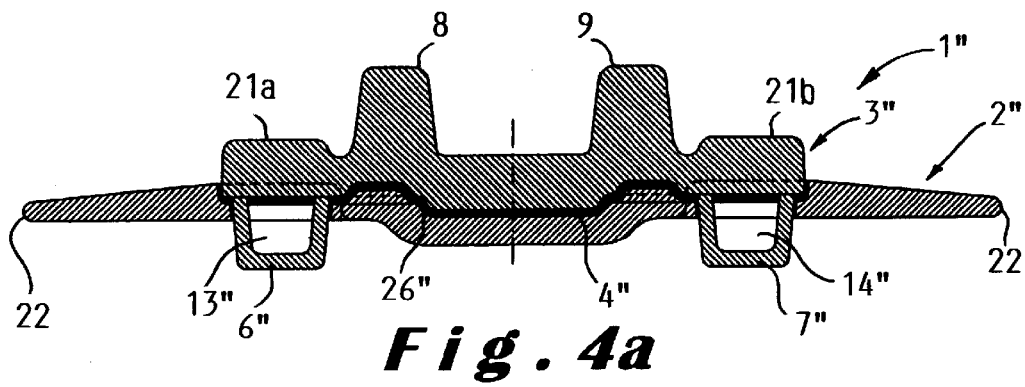
Figure 4B:
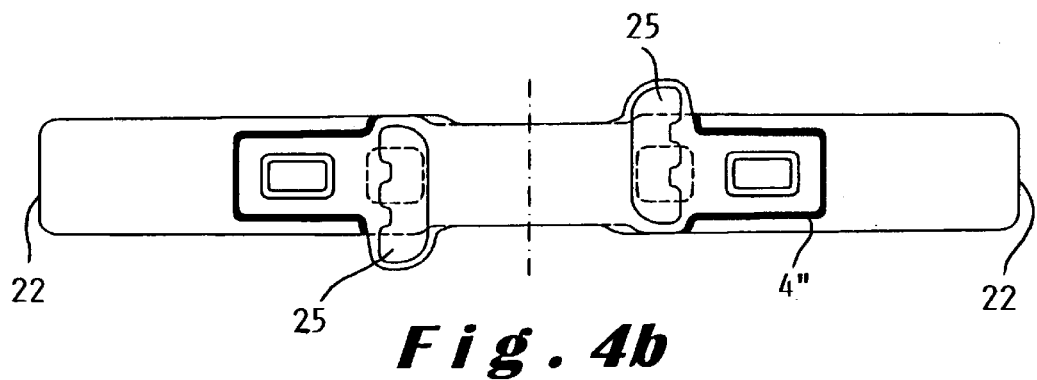
Figure 4C:
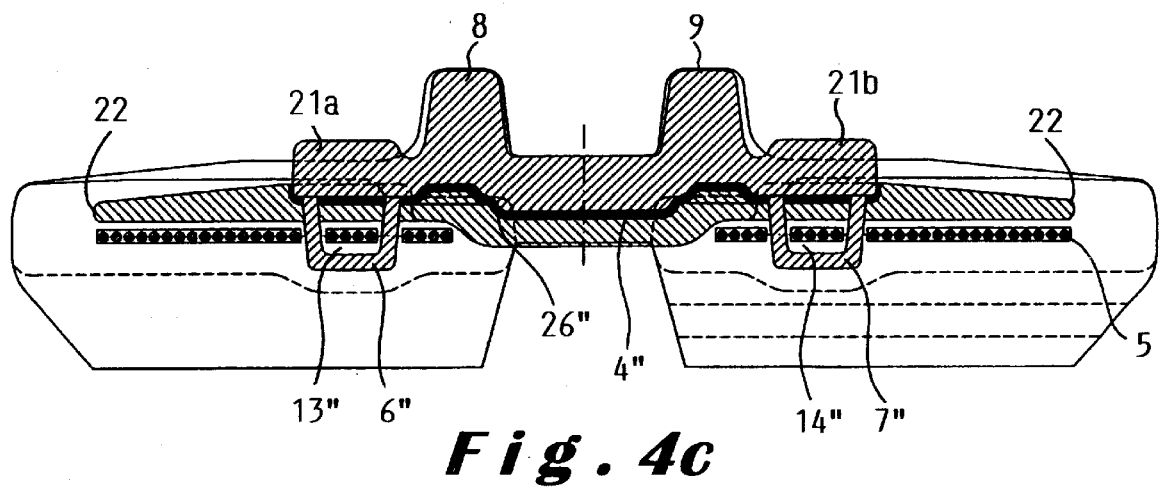
Figure 5A:
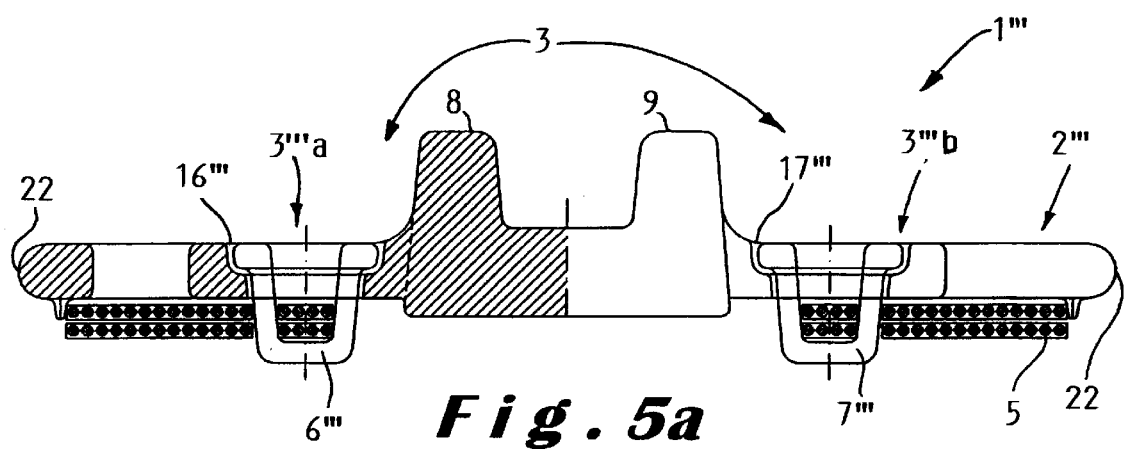
Figure 5B:
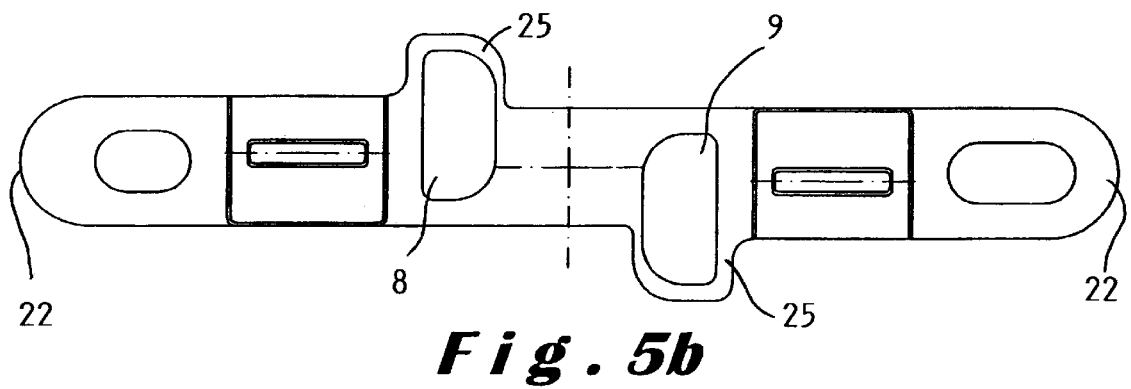
Figure 6:
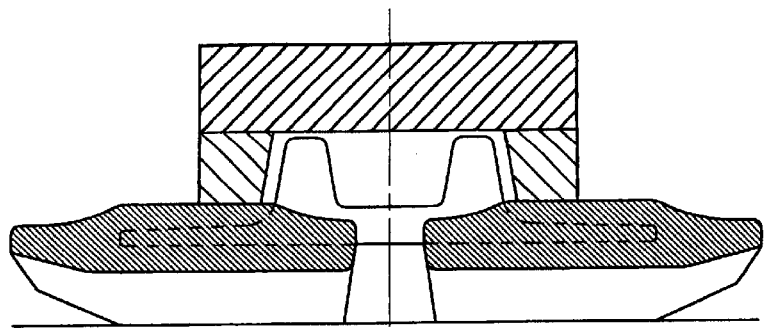

In the embodiment shown in FIGS. 4a–4c, the guiding 3" contains a third protuberance 21 and the running surface for the supporting rolls is elevated with respect to the carrier 2". The flush mounted guiding 3'" shown in FIG. 6 shows a number of advantages with respect to the mutual stiffness of the guiding 3""—carrier 2"" combination. Depending on the application, either the elevated guiding shown in FIG. 4, or the flush mounted guiding shown amongst others in FIG. 6, will be chosen. In the embodiment shown in FIGS. 5a–5b, the guiding is formed in two parts and the holes 16'", 17'" are flush mounted within the carrier 2'", so that the guiding 3'" can countersink into the carrier 2'", and form an essentially continuous running surface with the wings 22 of the carrier 2'".

In order to prevent that the steel cord would be subjected to too much wearing in the holes 16–16"", 17–17"" the steel cord can be provided with a protection. The protection can for example comprise a rubber layer, or protective plates provided lengthways around the steel cord, or a double row of steel cord can be provided which extends over almost the entire width of the hole 16–16"", 17–17"" (see FIGS. 5 and 6).

In case the provision of a mechanical anchoring of the metal core element 1 in the rubber crawler 10 is the only goal, the metal core element 1 can be made as one part and means can be provided for anchoring the core element 1 in the crawler 10 as is shown in FIG. 6. Suitable means for providing this anchoring have been described hereabove.

What is claimed is:

1. A rubber crawler, comprising:

an endless rubber belt directable around two toothed wheels; and parallel metal core elements embedded in the belt in a circumferential direction of the belt and extending in a cross direction of the belt and provided for guiding supporting rolls provided between said wheels, wherein each metal core element comprises a guiding for guiding said supporting rolls and a carrier for receiving said guiding, the carrier and the guiding are made as separate parts and are connected to each other, and each said metal core element is provided with means for mechanically anchoring the guiding in the rubber belt.

2. A rubber crawler as claimed in claim 1, wherein between said carrier and said guiding, a damping layer is provided.

3. A rubber crawler as claimed in claim 1 wherein the guiding and the carrier comprise complementary co-operating surfaces.

4. A rubber crawler as claimed in claim 1, wherein the guiding is made of two remote parts.

5. A rubber crawler, comprising:

an endless rubber belt directable around two toothed wheels; and parallel metal core elements embedded in the belt in a circumferential direction of the belt and extending in a cross direction of the belt and provided for guiding supporting rolls provided between said wheels, wherein each metal core element comprises a guiding for guiding said supporting rolls and a carrier for receiving said guiding, the carrier and the guiding are made as separate parts and are connected to each other, and each said metal core element is provided with means for mechanically anchoring the guiding in the rubber belt, wherein the carrier comprises a first hole and a second hole, and the guiding comprises a first protrusion and a second protrusion, the first and second protrusions provided for being received in said first and second holes, respectively.

6. A rubber crawler as claimed in claim 5, wherein said first and second protrusions each comprise a hole, an opening of each hole extends in a longitudinal direction of the belt, and the rubber belt comprises in the longitudinal direction at least one steel cord provided for extending throughout said holes of successive guidings.

7. A rubber crawler as claimed in claim 6, wherein said belt contains means for protecting the at least one steel cord.

8. A metal core element for a rubber crawler including an endless rubber belt directed around two toothed wheels, the metal core element comprising:

a guiding for guiding supporting rolls;

means for mechanically anchoring the guiding in the rubber belt; and a carrier for receiving said guiding, wherein the carrier and the guiding are made as separate parts and are connected to each other.

9. A metal core element as claimed in claim 8, further comprising a damping layer provided between the carrier and the guiding.

10. A metal core element as claimed in claim 8, wherein the guiding and the carrier comprise complementary, co-operating surfaces.

11. A metal core element as claimed in claim 8, herein the guiding is made of two remote parts.

12. A metal core element as for a rubber crawler including an endless rubber belt directed around two toothed wheels, the metal core element comprising:

a guiding for guiding supporting rolls;

means for mechanically anchoring the guiding in the rubber belt; and a carrier for receiving said guiding, wherein the carrier and the guiding are made as separate parts and are connected to each other, wherein the carrier comprises a first hole and a second hole, and the guiding comprises a first protrusion and a second protrusion, the first and second protrusions provided for being received in said first and second holes, respectively.

13. A metal core element as claimed in claim 12, wherein said first and second protrusions each comprise a hole, an opening of each hole extends in a longitudinal direction of the belt.

* * * * *